United States Patent [19]

Kalmanoviz

[11] 4,197,446
[45] Apr. 8, 1980

[54] ENERGY-SAVING DEVICE FOR DOMESTIC WATER HEATERS

[75] Inventor: Daniel Kalmanoviz, Kiriat Tivon, Israel

[73] Assignee: Energal Limited, Haifa, Israel

[21] Appl. No.: 808,641

[22] Filed: Jun. 21, 1977

[30] Foreign Application Priority Data

Jun. 29, 1976 [IL] Israel .................................... 49930

[51] Int. Cl.² ........................... F24H 1/20; F24J 3/02; H05B 1/00
[52] U.S. Cl. .................................... 219/297; 122/407; 126/362; 137/341; 219/279; 219/306; 219/314
[58] Field of Search ............................... 219/296–310, 219/312, 314, 316; 165/132; 126/350 R, 361, 362, 271; 122/13 A, 4 A, 407, 406 R; 137/341; 222/146 H, 146 HE

[56] References Cited

U.S. PATENT DOCUMENTS

| 692,480 | 2/1902 | Robertshaw | 126/362 UX |
|---|---|---|---|
| 1,235,203 | 7/1917 | Herz et al. | 219/314 |
| 1,886,135 | 11/1932 | Tannehill | 122/407 X |
| 2,686,863 | 8/1954 | Chandler | 219/297 X |

FOREIGN PATENT DOCUMENTS

| 107965 | 7/1939 | Australia | 219/314 |
|---|---|---|---|
| 451241 | 2/1913 | France | 126/362 |
| 337268 | 2/1936 | Italy | 219/301 |
| 442976 | 2/1936 | United Kingdom | 219/314 |

Primary Examiner—A. Bartis
Attorney, Agent, or Firm—Schwartz, Jeffery, Schwaab, Mack, Blumenthal & Koch

[57] ABSTRACT

An energy saving device for use in connection with a heat-insulated storage vessel in a domestic hot-water system is disclosed. When there is no demand for hot water, water contained in the vessel is heated in an electric through-flow heater and circulated by gravity, with the heated water rising into the vessel through an outflow pipe of the vessel and the water to be heated being supplied to the heater from the lower portion of the vessel through a jet pump, a vortex diode and a valve which are connected in series between the through-flow heater and a water inlet pipe to the vessel. As soon as a hot water faucet is opened, water from a supply enters the jet pump, and the jet pump causes water to flow through the water inlet pipe into the lower portion of the vessel. At the same time water of medium temperature from the upper portion of the vessel flows through the heater and is brought to high temperature before flowing to the faucet. The device may be used with a solar system, in which case the water stored in the storage vessel may be additionally heated by a solar heat collector.

8 Claims, 1 Drawing Figure

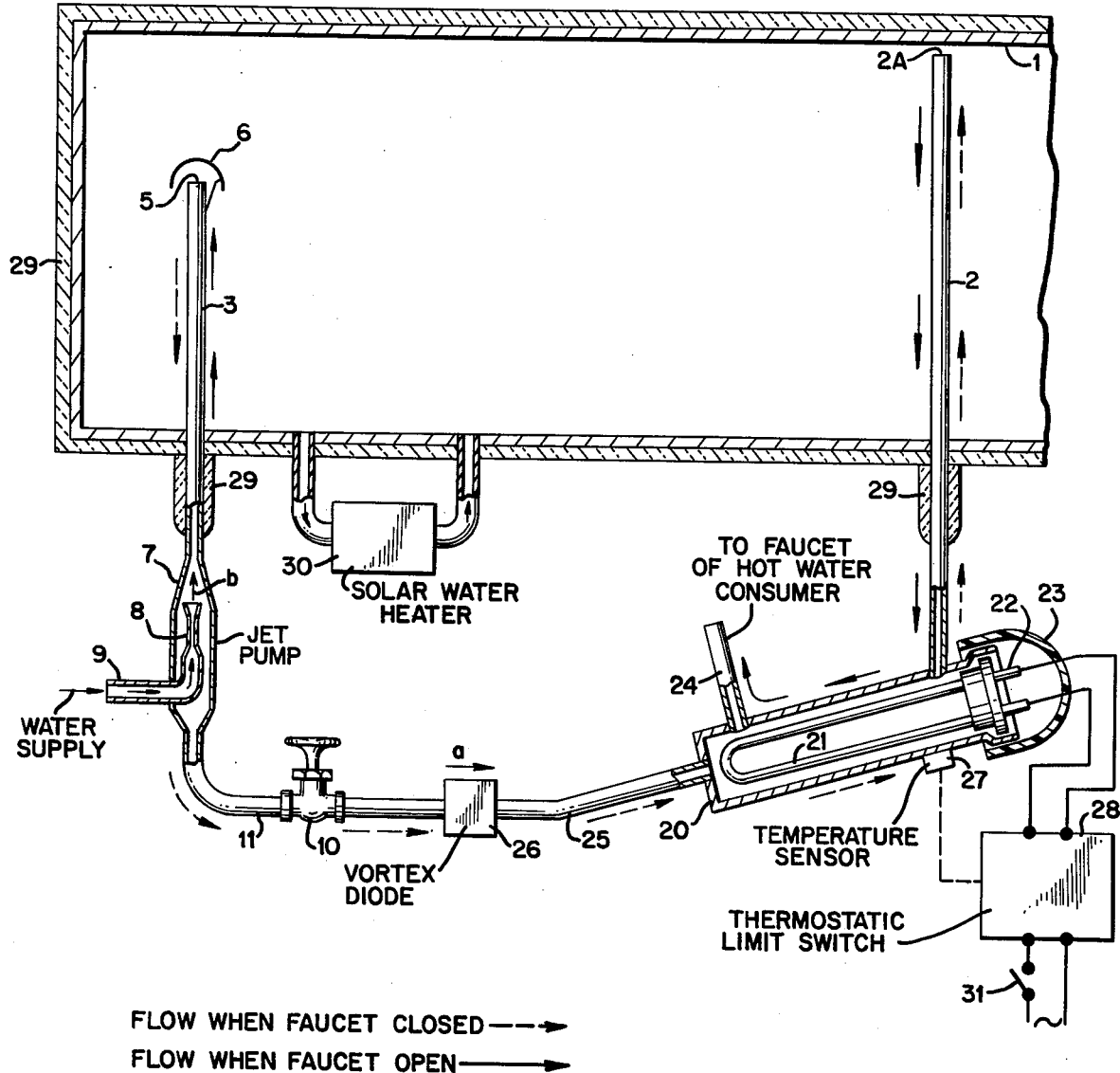

ENERGY-SAVING DEVICE FOR DOMESTIC WATER HEATERS

The invention relates to an energy-saving device for a domestic water heating system, of the type comprising an insulated storage vessel generally heated by solar or by electric energy. It relates more specifically to an electric through-flow heater incorporated in a dual-flow system that is adapted either to heat water flowing out of the vessel, to a high temperature or to slowly heat the water contained in the vessel, to a medium temperature.

In the existing domestic water heating systems the water in the storage vessel is generally heated to a much higher temperature than that required by the user, with a view to keep a sufficient reserve when large quantities of water are drawn off and the inflowing cold water lowers the mean temperature of the remaining water. Somewhat lower temperatures can be maintained in a known system wherein hot water is drawn off without being immediately replaced by cold water, which is arbitrarily admitted during a period when no hot water requirements are expected. In both cases the energy losses due to conduction, radiation and convection are very high.

On the other hand, much lower losses are experienced with through-flow heaters which, however, require a high wattage for normal water flow, the installation of which is generally not feasable in an average apartment building.

It is, therefore, the object of the present invention to minimize the high energy losses by heat transmission to the surroundings as experienced with conventional water heaters which are generally set to a temperature of 60–80 degrees centigrade, by maintaining in a storage vessel a temperature equal or slightly above that of the surrounding atmosphere, and to enable a person to have this water heated to a desired temperature by switching on an electric heating element of a relatively low wattage rating at a predetermined time prior to its use, and consecutively have the outflowing water heated to the temperature required for showering, dishwashing and the like. It is a further object of the invention to convert existing heating installations to energy-saving systems by supplying and attaching suitable appliances. Still another object of the invention is to cause stratification of warm and cold water in the storage vessel with a view of having water at higher temperature available near the outlet for further heating. Another object is to provide energy saving devices suitable for connection to solar heating apparatus to be energised during cloudy periods.

The invention involves an energy-saving device for a domestic water heating system including a storage vessel which is provided with a water outlet pipe having an inner opening in the upper portion of the vessel and extending to the outside thereof, and with a water inlet pipe having an inner end opening in the vessel at a level below the outlet pipe opening and extending to the outside of the vessel. The device comprises an electric through-flow heater and a water jet pump positioned in series in a water duct means connecting the outer ends of said outlet pipe and said inlet pipe respectively. A throttling and regulating means, such as a valve, is interposed between said through-flow heater and said water jet pump. The water jet pump has a nozzle connected to a domestic water supply, with an outlet port connected to the outer end of the inlet pipe and with an inlet port connecting the pump to said throttling and regulating means. The jet pump is positioned so as to accelerate water in the direction of the inlet pipe. The through-flow heater includes an electric heating element positioned in an oblong chamber. The chamber has an upper end and a lower end with the upper end positioned at a higher level than the lower end. The chamber is further provided with a first port proximate its upper end connected to the outside end of said water outlet pipe, a second port proximate its lower end and connected to hot water consumers and a third port proximate the lower end and connected to said throttling and regulating means. Electric means are provided for energizing the through-flow heater in accordance with the required water temperature. The device may be used with a solar heating system, in which case the water in the storage vessel may be additionally heated by a solar heat collector.

In a preferred embodiment of the water heating system a thermostatic limit switch is positioned with its feeler attached to the outside of the through-flow heater. The water jet pump is preferably of the Venturi type having an outer casing and a nozzle coaxial with the water inlet pipe, the fresh water supply being connected to the nozzle through a pipe entering the casing in radial direction. The throttling and regulating means may be in the form of a regulating valve positioned in a pipe which connects the inlet and outlet pipe of the vessel; as an additional means for controlling the direction of flow a Vortex diode of known design may be inserted in series with the regulating valve. The water heating system works on the principle that the water in the storage vessel is kept at, or slightly above, the temperature of the surrounding air, thus eliminating heat losses. With solar heaters this obviously applies to sunless periods only, when electric heating becomes necessary. The person wishing to obtain hot water, say for washing in the morning, operates a switch energising the heating element a certain number of minutes before he actually needs the hot water, in order to preheat the bulk of the water in the storage vessel to a predetermined temperature above that of the atmosphere. The water starts circulating in the system in that the heated water rises from the top of the through-flow heater through the "outlet pipe" to the top of the vessel and displaces cooler water through the "inlet pipe" and the connecting piping into the bottom portion of the through-flow heater. The circulation velocity is adjusted to the required primary temperature by means of the throttling means as, e.g., a regulating valve, with a view to obtain sufficiently slow circulation and, accordingly, a minimum heat transfer between the heated water at the top of the vessel and the undisturbed water below. The preheating time necessary for obtaining a certain hot water quantity is mostly learned by experience, but it is obvious that it will be longer for getting sufficient water for a shower than for a shave. Likewise, it will be necessary to heat up the entire contents of the vessel during several hours, when a large quantity of hot water will be required. After the preheating period the faucet or faucets can be opened, whereupon the flow direction in the system is reversed by action of the jet pump which accelerates the water in the direction of the inlet pipe opening. Heated water from the top of the vessel is driven out by the incoming cold water through the outlet pipe into the through-flow heater, where it is now brought to a higher temperature and leaves the heater through a faucet for domestic use. Cold water is prevented from passing through the connecting pipe direct to the through-flow heater by the action of the jet pump on the one hand and by the regulating valve and/or the vortex-diode on the other. The water heating system may alternatively be used for keeping the water contained in the vessel, at a temperature below that needed at the faucets, but above fresh water temperature, by permanently actuating the through-flow heater element and to regulate the temperature by means of a thermostat, with its feeler in contact with the storage vessel. The flow through the system is reversed as soon as a faucet is opened and the preheated water can be additionally heated by the through-flow heater. Heat losses would be greater than with the aforedescribed mode of operation but less than with the conventional water heater adjusted to a high temperature. This method lends itself to the arrangement of a flow switch in the water outlet, which would energise the through-flow heater whenever water is being consumed and to heat it to the required temperature.

The sole view of the accompanying drawing illustrates, by way of example only, one embodiment of an energy-saving device connected to a storage vessel provided with specially designed water inlet and outlet pipes.

Herein a horizontally positioned cylindrical storage vessel 1, which is preferably heat-insulated by lagging 29, is provided with a water outlet pipe 2 having its inner end opening 2 A near the top of the vessel, and a water inlet pipe 3 having its opening 5 at a small distance above the vessel axis but below the level of the upper end of pipe 2. Facing the opening 5 of the pipe a baffle 6 of known design serves to break up the flow and to prevent circulatory water movement in the vessel. The lower portion of the inlet pipe 3 is connected to the outlet of a water jet pump housing 7. The jet pump includes a nozzle 8 connected to a water supply through a pipe 9 entering the housing radially. The lower end of the housing 7 is connected to a regulating valve 10 by means of a pipe 11. The outlet pipe 2 is, at its lower end, connected to a through-flow heater which comprises an inclined, cylindrical housing 20 and axially enclosed therein is an electric resistor 21 of conventional design. The resistor is sealedly fastened in the housing, and its terminals 22 are covered by a cover 23. The outlet pipe 2 enters the housing 20 near the latter's upper end, while a connection 24 is provided near its lower end which leads to consumers such as a bath tub, a shower and the like. The bottom of the housing is connected to the aforementioned regulating valve 10 through a pipe 25, and a Vortex diode 26 of known design is inserted into this pipe, Which is designed to allow water to freely flow in the direction of the arrow a, but offers a higher flow resistance in the opposite direction. A thermostat limit switch 28 adapted to energise the heating element, has its feeler 27 attached to the outside of the through-flow heater housing.

The housing 20 of the through-flow heater is shown to be inclined to the horizon at an angle of 15°, but any other inclination from a minimum of 6° to a maximum of 90°, i.e. vertical position, is feasable.

At the price of a small reduction in efficiency the vortex diode may be omitted to save first costs, the regulating valve 10 remaining as the sole throttling and regulatiing means.

All parts carrying heated water are preferably insulated by lagging 29 of suitable thickness. However, the lagging 29 about the jet pump, the valve 10, the vortex diode, the through-flow heater and the connecting pipes is only partially illustrated on the drawing.

The storage vessel 1 in the drawing is shown in the form of a horizontally positioned cylinder, but it is obvious that the same effect can be obtained with an inclined or vertically placed vessel.

The vessel may be provided with a thermostatic switch adapted to keep the water at a temperature intermediate between that of the water supply and that required by the consumer. Like-wise, an air vent is advantageously provided at the top of the vessel to ensure its complete filling.

The operation of the water heating system will now be explained with reference to the accompanying drawings: The vessel 1 is filled with water up to its top - in any case to a level above the outlet pipe - which is kept at about room temperature as long as the through-flow heater is not energised. A person wishing to use hot water energises the heating element 21 a given number of minutes before the actual use, by turning a switch 31. A quantity of water contained in the system is slowly preheated in the through-flow heater and circulated by gravity forces. The heated water rises in the "outflow pipe 2" to the top of the vessel and displaces cold water through the "inlet pipe 3" back into the heater, the regulating valve is closed to the extent that the water velocity remains low so as to obtain the required temperature and to prevent the water in the vessel from mixing vehemently, with the result that a layer of heated water is formed in the upper portion, leaving the underlying layers cool. The direction of flow in this condition is indicated by broken line arrows in the drawing.

After the said upper layer has been sufficiently preheated, a faucet associated with outlet connection 24 from housing 20 may be opened which draws water from the upper layer through the outlet pipe 2 into the heater imparting to it additional heat energy up to the required tap temperature. The direction of flow is controlled by the action of the jet pump 7,8 which accelerates the water in the direction of the arrow b through the inlet pipe 3 into the vessel. The water flowing out of the inlet pipe is met by the baffle 6 which prevents a circulatory movement in the vessel, with the object to leave the layers of different temperature undisturbed. This causes the water entering the top of the outlet pipe to be of sufficiently high temperature, until the layer volume is exhausted. The direction of flow in this condition is indicated by solid line arrows in the drawing. The quantity of preheated water increases with the preheating period, and it is in the hands of the user to switch on the heating element at a suitable time before the actual use, in accordance with requirements. The other mode of operation is to set the thermostat in the vessel at a temperature below that required at the faucets while leaving the heating element permanently energised, until it is switched off by action of this thermostat. This would heat the water in the storage vessel to a higher temperature which would then be drawn off and additionally heated by the through-flow heater.

As described before heating of water above the said intermediate temperature can also be accomplished by energising the through-flow heater element by means of a flow switch positioned in a suitable place in the water outflow piping. Saving of energy would not be as high as in the first mode of operation, but heat losses would still be considerably lower than with a conventional water heater adjusted to a temperature above that required at the faucet.

In the case of use with a solar system, the storage vessel 1 stores water generally heated in solar heat collector 30, illustrated schematically in the drawing. The water inlet pipe 3 has its opening 5 at a point above the bottom of the vessel not less than one-third and not more than two-thirds the total height of the vessel.

I claim:

1. In a domestic water heating system including a storage vessel which is provided with a water outlet pipe having an inner end opening in the upper portion of the vessel and extending to the outside thereof, a water inlet pipe having an inner end opening in the vessel at a level below the outlet pipe opening and extending to the outside of the vessel, the improvement comprising an energy-saving device including an electric through-flow heater and a water jet pump positioned in series in a water duct means extending between and connecting the outer ends of said outlet pipe and said inlet pipe, respectively, a throttling and regulating means interposed between said through-flow heater and said water jet pump, said jet pump having a nozzle connected to a domestic water supply, an outlet port connected to the outer end of said inlet pipe and an inlet port connected to said throttling and regulating means, the jet pump being positioned and arranged so as to accelerate water in the direction of said inlet pipe, the through-flow heater including an electric heating element positioned in an oblong chamber, the chamber having an upper end and a lower end, with the upper end positioned at a higher level than the lower end, said chamber being further provided with a first port proximate the upper end connected to the outside end of said water outlet pipe, a second port proximate the lower end connected to hot water faucets and a third port proximate the lower end connected to said throttling and regulating means, said through-flow heater being provided with control means for energizing the heating element of said through-flow heater in accordance with the required water temperature.

2. A domestic water heating system as defined in claim 1 wherein said control means for energizing said electric heating element of through-flow heater comprises a thermostatic limit switch having its feeler attached to the outside of the chamber of said through-flow heater.

3. A domestic water heating system as defined in claim 1 wherein said water jet pump is of the Venturi type provided with an outer casing and a nozzle, both coaxial with said water inlet pipe, and the connection from the domestic water supply to the nozzle enters the casing in a radial direction.

4. A domestic water heating system as defined in claim 1 wherein said means for throttling and regulating the water flow through the water heating system comprises a regulating valve.

5. A domestic water heating system as defined in claim 1 wherein said means for throttling and regulating the water flow through the water heating system comprises a regulating valve and a vortex diode positioned in series, said vortex diode allowing water to flow freely from said pump toward said through-flow heater but offering a higher flow resistance in the opposite direction.

6. A domestic water heating system as defined in claim 1 wherein said water outlet pipe comprises a vertical pipe having its inner end opening proximate a highest point in said storage vessel.

7. A domestic water heating system as defined in claim 1 wherein said storage vessel stores water generally heated in solar heat collectors and wherein said water inlet pipe has its opening at a point above the bottom of said vessel not less than a third and not more than two-thirds of the total height of said vessel.

8. A domestic water heater system as defined in claim 1 wherein a baffle is provided in front of the opening of said water inlet pipe into said water storage vessel to break up the water flow and to prevent circulatory water movement in the vessel.

* * * * *